United States Patent
Patel et al.

(10) Patent No.: US 7,734,317 B2
(45) Date of Patent: Jun. 8, 2010

(54) BATTERY MANAGEMENT

(75) Inventors: Jagrut V. Patel, San Diego, CA (US); Vyungchon Choe, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 29 days.

(21) Appl. No.: 10/776,437

(22) Filed: Feb. 10, 2004

(65) Prior Publication Data
US 2004/0198468 A1 Oct. 7, 2004

Related U.S. Application Data

(60) Provisional application No. 60/455,794, filed on Mar. 18, 2003.

(51) Int. Cl.
H04B 1/38 (2006.01)
H02J 7/00 (2006.01)

(52) U.S. Cl. .................. 455/572; 455/573; 455/574; 455/571; 320/129

(58) Field of Classification Search .............. 455/572, 455/573, 574, 571; 320/129
See application file for complete search history.

(56) References Cited

U.S. PATENT DOCUMENTS

| | | | | |
|---|---|---|---|---|
| 5,270,946 A | * | 12/1993 | Shibasaki et al. | 713/340 |
| 5,336,568 A | * | 8/1994 | Andrieu | 429/7 |
| 5,686,813 A | | 11/1997 | Huen et al. | 320/5 |
| 5,784,626 A | * | 7/1998 | Odaohara | 320/128 |
| 5,877,564 A | * | 3/1999 | Kuiri | 307/29 |
| 5,903,764 A | * | 5/1999 | Shyr et al. | 713/300 |
| 6,134,457 A | * | 10/2000 | Ha et al. | 455/572 |
| 6,346,794 B1 | | 2/2002 | Odaohhara | 320/116 |
| 6,452,362 B1 | * | 9/2002 | Choo | 320/116 |
| 6,459,171 B1 | * | 10/2002 | Leifer | 307/29 |
| 6,522,873 B1 | * | 2/2003 | Moles et al. | 455/572 |
| 6,522,902 B2 | * | 2/2003 | Nishihara et al. | 455/574 |
| 6,624,613 B2 | * | 9/2003 | Kitagawa | 320/124 |
| 6,664,764 B1 | * | 12/2003 | Odaohhara | 320/132 |
| 6,727,602 B2 | * | 4/2004 | Olson | 307/46 |
| 6,977,482 B2 | * | 12/2005 | Popescu-Stanesti et al. | 320/116 |
| 2001/0013767 A1 | | 8/2001 | Takemoto | 320/132 |
| 2004/0018851 A1 | * | 1/2004 | Koenck et al. | 455/550.1 |

FOREIGN PATENT DOCUMENTS

EP 0695017 B1 1/1996

OTHER PUBLICATIONS

US-PGPUB: US 2001/0054878 A1, Dec. 27, 2001, Odaohhara, Shigefumi; "Power Unit and Power Source Switching Apparatus for a Computer".*

* cited by examiner

Primary Examiner—Matthew D Anderson
Assistant Examiner—Wen W Huang
(74) Attorney, Agent, or Firm—Howard Seo

(57) ABSTRACT

Systems and techniques are disclosed relating to wireless communications. The systems and techniques involve an efficient power source for prolonged battery life. The power source may include first and second batteries, and a power management module configured to operate each of the first and second batteries in a pulse current discharge mode while supplying continuous current to a load.

22 Claims, 6 Drawing Sheets

BATTERY MANAGEMENT

RELATED APPLICATIONS

This application claims priority to U.S. Provisional Application No. 60/455,794 filed Mar. 18, 2003.

FIELD

The present disclosure relates generally to wireless communications, and more specifically, to battery management techniques in a wireless communications device.

BACKGROUND

Battery life is an important consideration in the design of wireless communication devices. Today, various power management techniques have been employed by manufacturers to reduce the average power consumption of the device, and thereby extend battery life. By way of example, efficient power management systems have emerged for second-generation (2G) voice communications in wireless communication devices equipped with code division multiple access (CDMA) technology. 2G CDMA systems are based on the TIA/EIA IS-95 CDMA standard, including IS-95A and IS-95B revisions. These standards are well known in the art. Today, it is not uncommon to find such devices with standby times of weeks and talk times of several hours. This is often achieved by intelligently switching the power to various processing resources.

To meet the growing demand for wireless services and high-speed data services, the third-generation (3G) of mobile services has recently emerged in the telecommunications industry. Much like the previous generation, CDMA provides the platform on which 3G services are provided. The International Telecommunication Union (ITU), working with industry bodies from around the world, defines and approves technical requirements and standards under the IMT-2000 (International Telecommunication Union-20 program).

Wireless communication devices with 3G services are feature rich multi-mode devices capable of supporting voice, high-speed Internet and multimedia communications. Some of the popular features on a high-end device, such as a mobile station modem (MSM) include: a MP3 player, a MPEG-4 decoder, Bluetooth, gpsOne, audio decoders, JPEG encoder/decoder, and the like. In many of these devices, the voice services are enhanced with live video. Some of these features may prohibit a power management scheme that interrupts the power source as is often done in devices supporting 2G services. This may result in a dramatic increase in average power consumption with the largest increases feeding the baseband circuitry, the memories and the display. Moreover consumer behavior studies indicate an increasing interest in lengthy connection of various digital services such as cameras and the Internet in the near future.

Various techniques have been proposed to reduce power consumption by wireless communication devices supporting 3G services. Some of the more common approaches include shrinking the device technology, caching, optimizing the front end architecture, using direct conversion transceivers, using foot and head switches, scaling the supply voltage (run-time throttling), and reducing the average current consumption (run-time frequency throttling and clock gating). These techniques are all well known in the art and have enjoyed some success in reducing the average power consumption of the device.

In reality, the average power consumption of the device is only one component of battery life. Further increases in battery life may be realized by increasing the efficiency by which the battery delivers energy to the various processing resources. The need for a battery efficient system is clear in wireless communications supporting 3G services. In these devices, traditional power management schemes directed to reducing average power consumption may not provide acceptable battery life. Accordingly, there is a need in the art for a battery efficient system that may be used alone, or in combination with other power management techniques, to increase battery life.

SUMMARY

In one aspect of the present invention, a power source includes first and second batteries, and a power management module configured to operate each of the first and second batteries in a pulse current discharge mode while supplying continuous current to a load.

In another aspect of the present invention, a power source includes first and second batteries, and means for operating each of the first and second batteries in a pulse current discharge mode while supplying continuous current to a load.

In yet another aspect of the present invention, a power source includes first and second batteries, a switch coupled to the first and second batteries, and a switch control module configured to operate the switch such that each of the first and second batteries are intermittently coupled to a load.

In a further aspect of the present invention, a method of supplying current to a load from first and second batteries includes connecting the first and second batteries to the load, disconnecting the first battery from the load while maintaining the connection between the second battery and the load, reconnecting the first battery to the load while maintaining the connection between the second battery and the load, and disconnecting the second battery from the load while maintaining the connection between the first battery and the load.

In yet a further aspect of the present invention, a wireless communications device includes a processor configured to support wireless communications, first and second batteries, and a power management module configured to operate each of the first and second batteries in a pulse current discharge mode while supplying continuous current to the processor.

It is understood that other embodiments of the present invention will become readily apparent to those skilled in the art from the following detailed description, wherein it is shown and described various embodiments of the invention by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

Aspects of the present invention are illustrated by way of example, and not by way of limitation, in the accompanying drawings, wherein.

DETAILED DESCRIPTION

Figure 1:
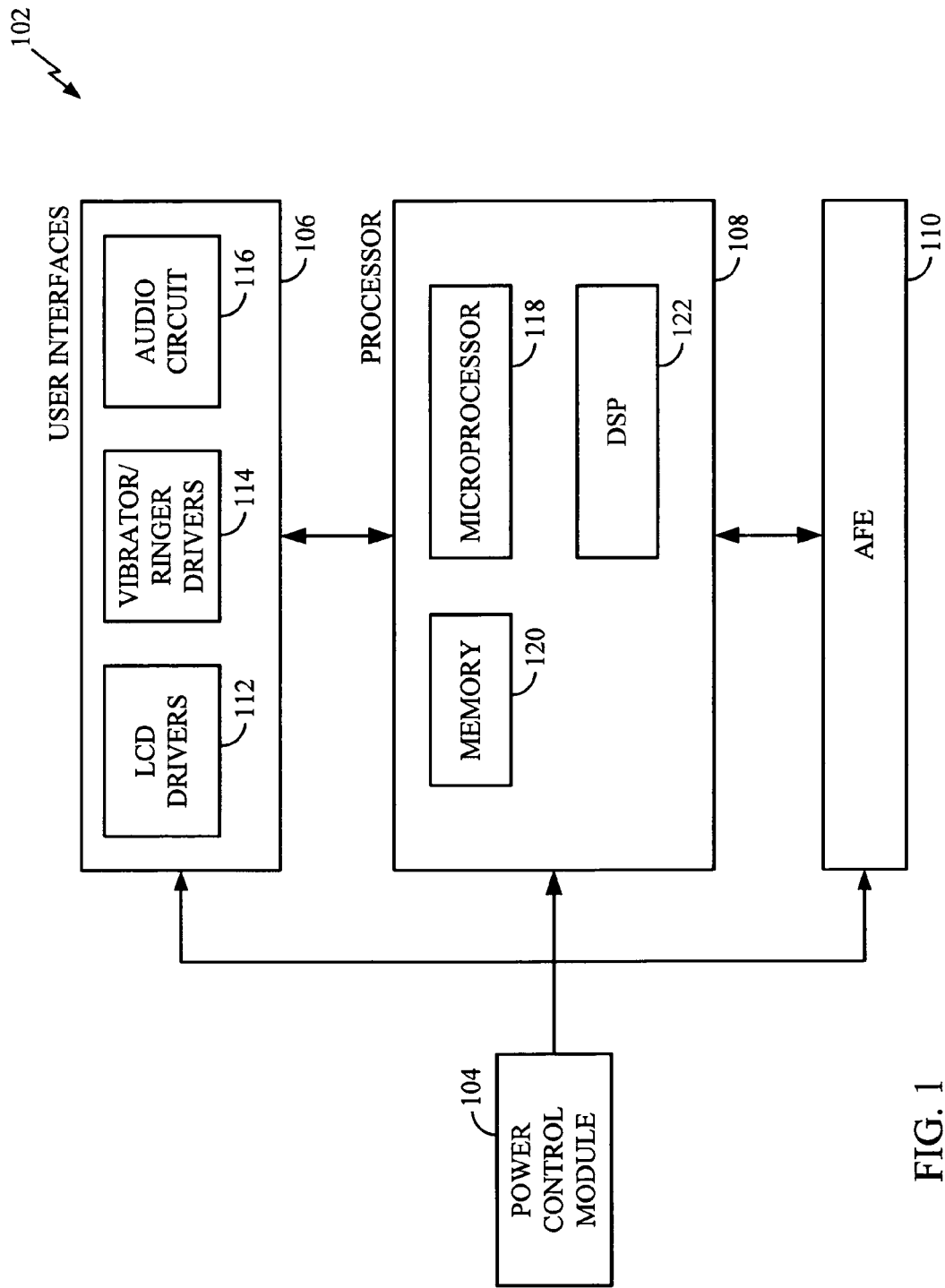
FIG. 1 is a block diagram illustrating an example of a wireless communications device having a software based processor architecture.

The detailed description set forth below in connection with the appended drawings is intended as a description of various embodiments of the present invention and is not intended to represent the only embodiments in which the present invention may be practiced. Each embodiment described in this disclosure is provided merely as an example or illustration of the present invention, and should not necessarily be construed as preferred or advantageous over other embodiments. The detailed description includes specific details for the purpose of providing a thorough understanding of the present invention. However, it will be apparent to those skilled in the art that the present invention may be practiced without these specific details. In some instances, well-known structures and devices are shown in block diagram form in order to avoid obscuring the concepts of the present invention. Acronyms and other descriptive terminology may be used merely for convenience and clarity and are not intended to limit the scope of the invention.

Wireless communication devices generally use batteries to power the electronics and various user interfaces (collectively referred to hereinafter as a "load"). The ability of the battery to provide a constant current source for an extended period of time depends on (1) the efficiency of the battery, and (2) the average power consumption of the device. Maximum battery life may be achieved by maximizing the efficiency of the battery while reducing the average power consumption.

A Lithium Ion battery with a rated capacity of 1600 milliamp-hours (mAh) typically has an efficiency in the range of 89-91% when providing a constant current. This means, theoretically, that the battery can produce approximately 1440 milliamps (mA) for one hour (1600 mAh×0.90). Alternatively, the battery could produce 144 mA for 10 hours, or 288 mA for 5 hours, or 720 mA for 2 hours, or even 2880 mA for 30 minutes. Although not entirely linear, the above calculations are fairly accurate over a normal range of battery use. Thus, one can readily see that for a given efficiency, battery life may be extended by implementing various power management techniques that reduce the average current consumption.

The battery life may also be extended by increasing the efficiency of the battery. By way of example, if the efficiency of a battery with a rated capacity of 1600 mAh could be increased from 90% to 98%, the deliverable capacity of the battery could be increased from 1440 mAh to 1568 mAh (1600 mAh×0.98). As a result, an 8-9% improvement in battery life may be achieved regardless of whether or not any power management techniques have been implemented.

One way to increase the efficiency of the battery is to operate it in a pulse current discharge mode. A battery may be operated in a pulse current discharge mode by intermittently connecting the battery to the load. For the purposes of this disclosure, the term "intermittently" means connecting the battery to the load and then disconnecting the battery from the load at regular or irregular intervals. Further, the "connection" to the load can either be direct or, where appropriate in the context, can be indirect, e.g., through intervening or intermediary devices or other means. By operating the battery in a pulse discharge mode, battery efficiency in the range of 97.5-99.95% may be achieved for a Lithium Ion battery with a rated capacity of 1600 mAh.

A wireless communications device with a battery operated in the pulse current discharge mode may provide extended battery life, and thus, increase the mobility of the device. The challenge faced by designers is that the hardware may require an uninterrupted power source to support various operating modes. To illustrate this concept, a battery configuration will be described in the context of a CDMA wireless communications device supporting 3G services. While the inventive aspects disclosed herein may be well suited for use with this application, those skilled in the art will readily appreciate that such inventive aspects are likewise applicable for use in other devices. Accordingly, any reference to a CDMA wireless communications device is intended only as an illustration, with the understanding that the various inventive aspects described throughout this disclosure have a wide range of applications.

FIG. 1 is a conceptual block diagram illustrating one possible configuration of a wireless communications device 102, often referred to as a subscriber station. As those skilled in the art will appreciate, the precise configuration of the wireless communications device may vary depending on the specific application and the overall design constraints. The wireless communications device 102 may include a power control module 104 capable of receiving power from various sources, such as batteries, an external charger, an adapter, and others. The power control module 104 may be used to generate all the regulated voltages needed to power various user interfaces 106, a processor 108 and an analog front end (AFE) 110. The power control module 104 may also be used to monitor and control the various power sources, detecting which sources are applied, verifying that they are within acceptable operational limits, and coordinating the recharging of the battery while maintaining the supply voltages.

The various user interfaces 106 may include a backlight or LCD drivers 112 with brightness (current) control that may be used for keypad and display functions, but may be user defined general purpose drivers. Independent vibrator and ringer drivers 114 may be used to alert a user of an incoming call. The user interfaces 106 may also include an audio circuit 116 for voice communications. These user interfaces 106 may be used to support 2G services including voice and low rate data communications. In some embodiments, such as those supporting 3G services, the user interfaces 106 may also be used to support a high speed Internet connection, such as the case may be with an integrated web browser.

The processor 106 may be a software based processor system, or any other configuration known in the art. In the embodiment shown in FIG. 1, the software based processor has a microprocessor 118 at its core with memory 120. The microprocessor 118 may provide a platform to run software programs that, among other things, handles all of the housekeeping functions for the various user interfaces 104, coordinates the command and control signaling functions with the base station (not shown), and controls the call processing states of the wireless communications device 102. The memory 120 may be used to provide storage for the device's operating system and customized features, such as the phone directory and other similar features.

A digital signal processor (DSP) 122 may be implemented with an embedded communications software layer which runs application specific high-speed algorithms to reduce the processing demands on the microprocessor 118. These specific high-speed algorithms may include encoding and modulation of voice and data generated by the audio circuit 116 or entered from the keypad before transmission to a far end user through the AFE 110. The DSP 122 may also provide decoding and demodulation of voice and data from the far end user received through the AFE 110 before delivery to the audio circuit 116 or presentation to the display. The software layer may also be used to interface the DSP hardware to the microprocessor 118 and may provide low level services such as allocation of resources to allow the higher level software programs to run.

Figure 2:
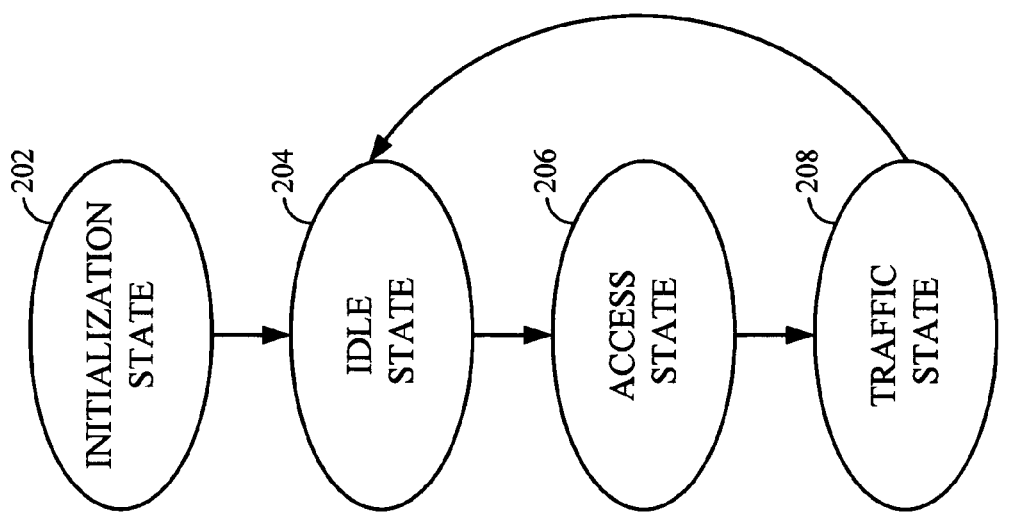
FIG. 2 is a state diagram illustrating an example of various operating states of a wireless communication device.

FIG. 2 is a state diagram illustrating the call processing states of a wireless communications device supporting 3G services. When power is initially applied to the device, it may enter into an initialization state 202. During the initialization state 202, the device may be used to process the pilot and synchronization channels to acquire system timing. Once the device has fully acquired system timing, it may enter into the idle state 204.

In the idle state 204, the device may be used to monitor the paging channel for an incoming call. In order to conserve battery power, slotted paging may be used. In a slotted paging configuration, both the wireless communications device and the base station agree in which slots the device will be paged. The device can power down some of its processing circuitry during unassigned slots and enter into a sleep mode. In the sleep mode, the typical wireless communications device may draw roughly between 200 and 400 µA. During assigned slots, the device wakes up and monitors the paging channel. The length of the assigned slots depends on the type of paging. Registration may also be part of the idle state when the device wakes up. Registration is the process by which the device makes its whereabouts known to the base station. Typically, the current required during the idle state to monitor the paging channel and register may be roughly between 55 and 65 mA.

When the device receives a page, or originates a call, it may enter into an access state 206 to negotiate the parameters of the call with the base station through the exchange of signaling messages. Once the call is negotiated, the device may be directed to a traffic channel to support the call. During the call, the device may enter a traffic state 208 which typically may require an average current on the order of 120-150 mA. Depending on the type of application, a typical device supporting 3G services may consume on the average roughly 65-250 mA. Moreover, the type of current discharge profile required to support the application may vary. By way of example, a camera may be supported with a pulse current discharge profile whereas a MP3 player would need a constant current discharge profile.

As explained earlier, battery life may be extended by operating the battery in a pulse current discharge mode. In many communication devices, the software may be modified to accommodate this type of operation. In the case of a CDMA device operating in the traffic state, software modifications to support a battery operating in the pulse current discharge mode may have an adverse impact on the performance of the device, especially in time sensitive applications. Accordingly, a high efficiency battery management scheme may be implemented by alternately switching two or more batteries to the load.

Figure 3:
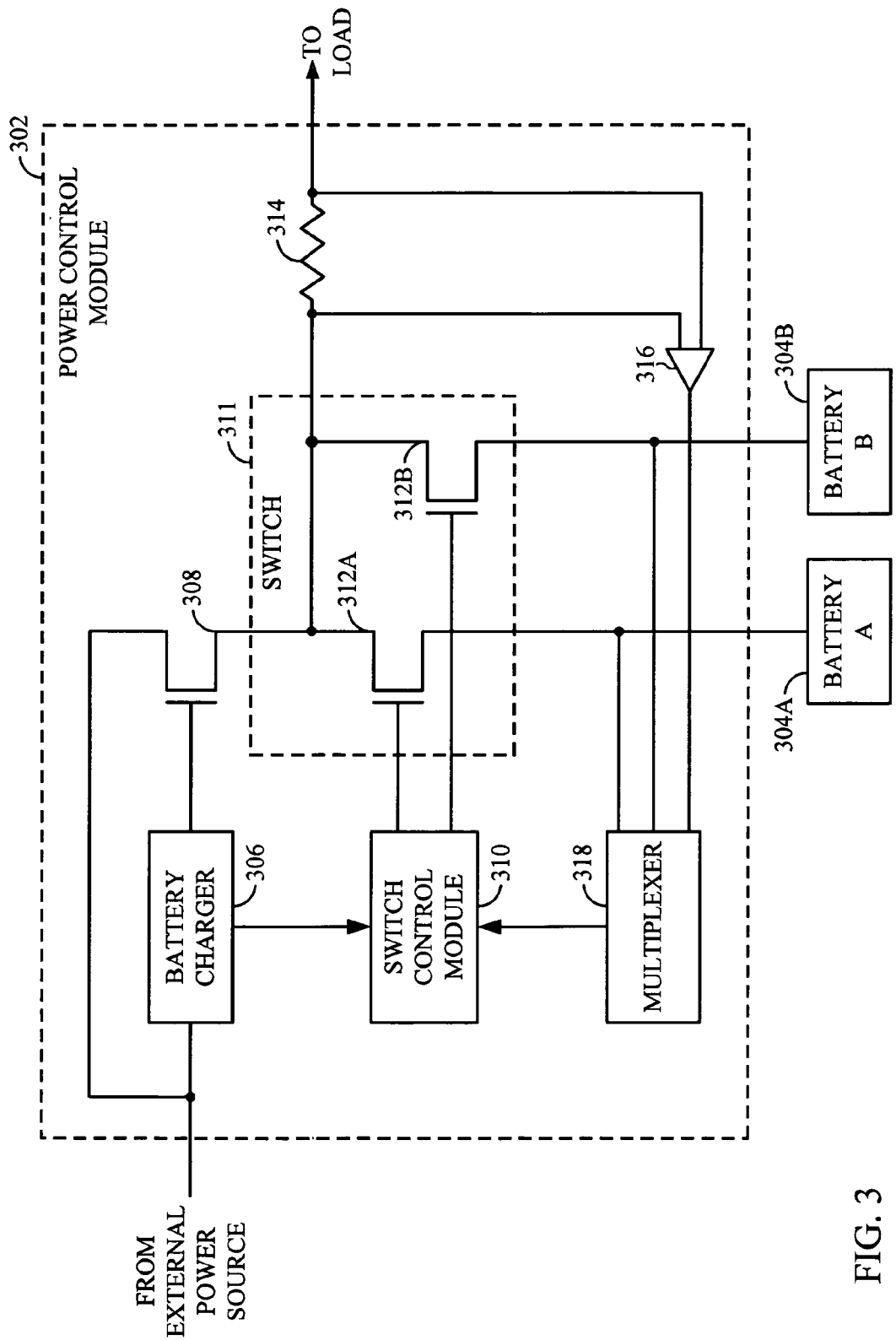
FIG. 3 is a schematic representation of an embodiment of a power control module.

FIG. 3 is a schematic representation of a power control module 302 configured to alternatively switch two batteries 304a and 304b, both operating in a pulse discharge mode, to the load (not shown). The embodiment shown in FIG. 3 may be the configuration of choice in existing legacy devices to best utilize the existing electronics. In future generation wireless devices, it may be more convenient to use an integrated package as a power source. The integrated package may include the power control module 302 along with the two batteries 304a and 304b operating in the pulse discharge mode in a single case or housing. The two internal batteries may be alternately switched to a single output from the case or housing to provide a constant current source.

Referring to FIG. 3, the load may be powered by various sources: an external power source (not shown) and the batteries 304a and 304b. The power control module 302 may be used to coordinate these sources—detecting which sources are applied, verifying that they are within acceptable operational limits, and coordinating the recharge of the batteries 304a and 304b while maintaining the supply voltages to the load.

A battery charger 306 may be used to detect whether the wireless communications device is connected to an external power source. If the battery charger 306 detects an external power source, it may apply the appropriate gate voltage to a field effect transistor (FET) 308 to connect the external power source to the load. The external power source may also be used to charge the two batteries 304a and 304b. This may be achieved by providing a control signal from the battery charger 306 to a switch control module 310. In response to the control signal, the switch control module 310 may connect the batteries 304a and 304b to the external power source through a switch 311. In the embodiment shown in FIG. 3, the switch 311 may be implemented with two FETs 312a and 312b.

In the absence of an external power source, the battery charger 306 may be used to bias the FET 308 to disconnect the external power source input line from the load. A control signal may also be provided from the battery charger 306 to the switch control module 310 indicating that the batteries 304a and 304b are the only source of power. In response to the control signal, the switch control module 310 may identify the state of the wireless communications device, and depending on the battery voltages, alternatively switch the two batteries 304a and 304b to the load such that each battery operates in a pulse current discharge mode.

The state of the wireless communications device may be determined with a voltage sense feedback resistor 314. The voltage drop across the voltage sense feedback resistor 314 may be used by a differential amplifier 316 to generate a voltage that is representative of the total current supplied to the load. This voltage, along with the battery voltages, may be alternatively supplied to the switch control module 310 through a multiplexer 318. Alternatively, the three voltages may be applied directly to the switch control module 310.

The operation of the switch control module 310 may vary depending on the specific performance parameters and the overall design constraints. Those skilled in the art will be readily able to implement a switch control module for their particular application. The operation of an embodiment of the switch control module 310 will be illustrated with reference to FIG. 4, by way of example and without limiting the various other embodiments that fall within the scope of the invention.

Figure 4:
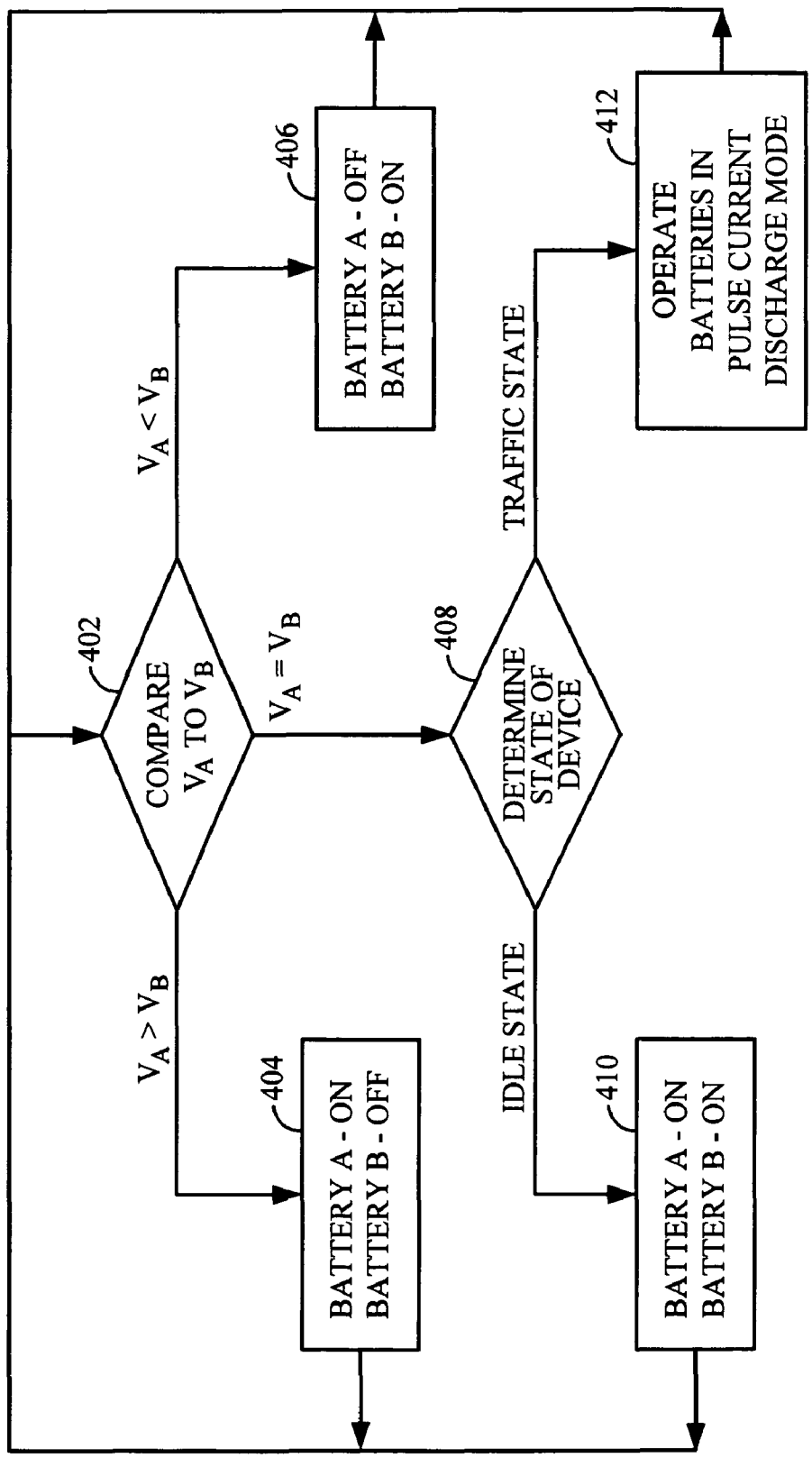
FIG. 4 is a flow diagram illustrating the operation of an embodiment of a power control module.

Referring to FIGS. 3 and 4, the switch control module 310 may be configured to first compare the voltage of the two batteries in step 402. Both batteries should be at the same potential. A voltage difference between the batteries could result in the battery with the higher potential being clipped to the lower voltage of the two, thus reducing the current throughput to the load. If there is a significant voltage difference between the two batteries, then the switch control module 310 uses the battery with the higher voltage to supply the current to the load until both batteries are at the same voltage. More specifically, if the voltage ($V_A$) of the first battery 304a exceeds the voltage ($V_B$) of the second battery 304b, then the switch control module 310 applies the appropriate gate voltages to the FETs 312a and 312b in step 404 to force the first FET 312a into the conducting mode and the second FET 312b into the non-conducting mode. This configuration results in the first battery 304a being connected to the load. Conversely, if the voltage ($V_B$) of the second battery 304b exceeds the voltage ($V_A$) of the first battery 304a, then the switch control module 310 applies the appropriate gate voltages to the FETs 312a and 312b in step 406 to force the first FET 312a into the non-conducting mode and the second FET 312b into the conducting mode. As a result, the second battery 304b is connected to the load. This procedure continues until the battery voltages are equal, $V_A = V_B$.

Once the battery voltages are equal, $V_A = V_B$, the switch control module 310 may then determine the state of the wireless communications device in step 408. This may be achieved by monitoring the voltage output from the differential amplifier 316. The default condition of the switch control module 310 may be to declare the wireless device in the idle state unless the switch control module 310 detects a large current drawn from the batteries for an extended period of time. As explained in greater detail earlier, slotted paging may be used during the idle state to conserve battery power. In a slotted paging configuration, both the wireless communications device and the base station agree in which slots the device will be paged. The device may enter into the sleep mode during unassigned slots. During the sleep mode, the current drawn from the batteries is negligible. The current drain on the batteries only becomes noticeable when the wireless device wake ups in assigned slots to check for a page. Thus, the batteries are effectively operating in a pulse discharge mode, and therefore, may be continuously connected to the load. More specifically, if the voltage from the differential amplifier 316 does not exceed a threshold voltage for a predetermined period of time, then the switch control module 310 may apply the appropriate gate voltages to the FETs 312a and 312b in step 410 to force both of them into the conducting mode. This configuration results in the both batteries 304a and 304b being connected to load.

Conversely, if the switch control module 310 detects a voltage generated by the differential amplifier 316 that exceeds the threshold voltage for the predetermined period of time, then the switch control module 310 determines that the wireless device is in the traffic state. In the traffic state, the switch control module 310 alternately switches the two batteries 304a and 304b to load in step 412.

The switching methodology should be configured to avoid power glitches. This may be achieved by setting the duty cycle for each battery to a value greater than 50% such that an idle battery is connected to the load before the other battery is disconnected in a make-before-break fashion. Typically, the duty cycle for each battery should be somewhere between 55% and 100%, and may be programmed by the manufacturer or distributor at the factory. The switching frequency of the batteries and the margin may also be programmed into the device. Typically, the margin should be between 5% and 10%.

Figure 5:
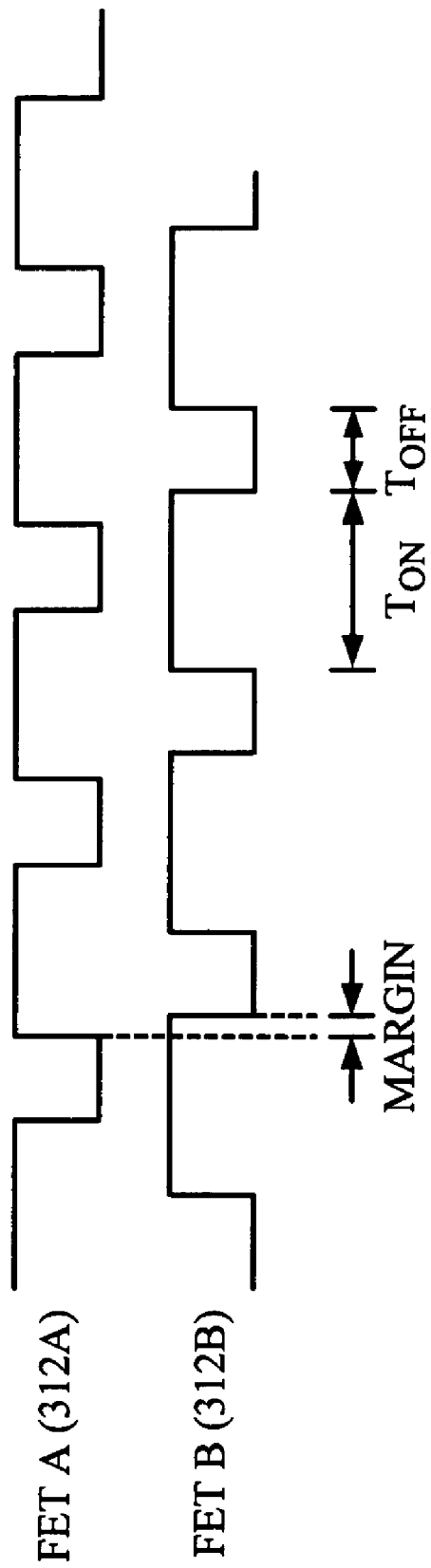
FIG. 5 is a timing diagram illustrating an example of a battery switching algorithm.

An example of a switching waveform for the batteries is shown in FIG. 5. The waveforms in FIG. 5 represent the voltage applied to the gates of the FETs 312a and 312b. In order to maintain some degree of overlap, the maximum allowable delay between the rising edge of the gate voltages applied to the two FETs is ($T_{ON}$–Margin) and the minimum allowable delay is ($T_{OFF}$+Margin).

Figure 6:
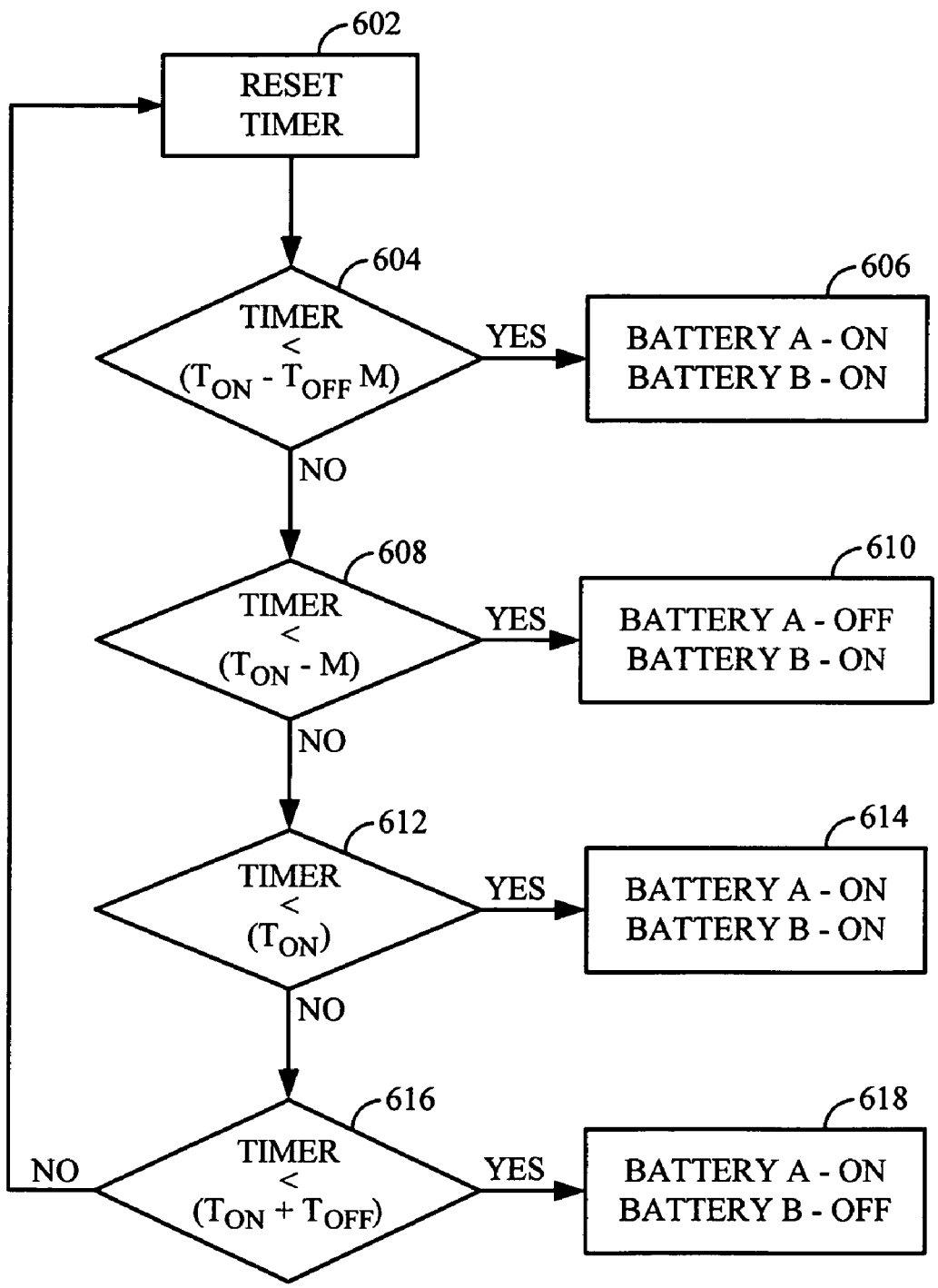
FIG. 6 is a flow diagram illustrating an example of a battery switching algorithm.

The switching waveform may be generated in a variety of ways. One example will be illustrated with the flow chart of FIG. 6. Referring to FIGS. 3 and 6, the switch control module 310 may reset an internal timer (not shown) in step 602 once it determines that the wireless device is in the traffic state. Once the internal timer is reset, the following algorithm may be executed by switch control module 310.

In step 604, the switch control module 310 may determine whether the internal timer is less than ($T_{ON}$–$T_{OFF}$–Margin). If the internal timer is less than ($T_{ON}$–$T_{OFF}$–Margin), then the switch control module 310 may apply the appropriate gate voltages to the FETs 312a and 312b in step 606 to force both of them into the conducting mode. This configuration results in both of the batteries 304a and 304b being connected to load. Once the internal timer reaches ($T_{ON}$–$T_{OFF}$–Margin), then the switch control module 310 may advance to step 608.

In step 608, the switch control module 310 may determine whether the internal timer is less than ($T_{ON}$–Margin). While the internal timer is less than ($T_{ON}$–Margin), the switch control module 310 may remove the gate voltage to the first FET 312a in step 610 to disconnect the first battery 304a from the load. Once the internal timer reaches ($T_{ON}$–$T_{OFF}$–Margin), then the switch control module 310 may advance to step 612.

In step 612, the switch control module 310 may determine whether the internal timer is less than ($T_{ON}$). While the internal timer is less than ($T_{ON}$), the switch control module 310 may apply the appropriate gate voltage to the first FET 312a in step 614 to reconnect the first battery 304a to the load. Once the internal timer reaches ($T_{ON}$–Margin), then the switch control module 310 may advance to step 616.

In step 616, the switch control module 310 may determine whether the internal timer is less than ($T_{ON}$+$T_{OFF}$). While the internal timer is less than ($T_{ON}$+$T_{OFF}$), then the switch control module 310 may remove the gate voltage to the second FET 312b in step 618 to disconnect the second battery 304b from the load. Once the internal timer reaches ($T_{ON}$+$T_{OFF}$), then the switch control module 310 loops back to step 602 to reset the internal counter and generate another cycle of the switching waveform.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor. The processor and the storage medium may reside in an ASIC. The ASIC may reside in the subscriber station, or elsewhere. In the alternative, the processor and the storage medium may reside as discrete components in the subscriber station, or elsewhere in an access network.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A power source, comprising:
    first and second batteries;
    means for determining a current required by a load;
    means for determining, based on the required current, whether to operate each of the first and second batteries in a pulse current discharge mode or to continuously couple the first and second batteries to the load;
    means for operating each of the first and second batteries in the pulse current discharge mode while supplying continuous current to the load when no voltage differential exists between the first and second batteries and when the current required by the load exceeds a threshold; and
    means for continuously coupling the first and second batteries to the load when no voltage differential exists between the first and second batteries and when the current required by the load is below the threshold.

2. The power source of claim 1 wherein the means for operating each of the first and second batteries in a pulse discharge mode comprises a first switch configured to intermittently couple the first battery to the load, a second switch configured to intermittently couple the second battery to the load, and means for controlling the first and second switches.

3. The power source of claim 2 wherein the means for operating each of the first and second batteries in a pulse discharge mode further comprises means for measuring the current supplied to the load, the means for controlling the first and second switches being responsive to the measured current.

4. The power source of claim 2 wherein the means for controlling the first and second switches is configured to couple the first battery to the load before removing the second battery from the load.

5. The power source of claim 2 wherein the means for controlling the first and second switches is responsive to voltage measured at each of the first and second batteries.

6. The power source of claim 1 further comprising means for continuously coupling the battery with a greater voltage to the load when a voltage differential exists between the first and second batteries.

7. A wireless communications device, comprising:
    a processor configured to support wireless communications, the processor being further configured to operate in a traffic state or an idle state;
    first and second batteries; and
    a power management module configured to determine whether the processor is operating in the traffic state or the idle state, and, based on the operating state of the processor, the power management module being further configured to determine whether to operate each of the first and second batteries in a pulse current discharge mode or to continuously couple the first and second batteries to the processor,
    wherein the power management module is further configured to operate each of the first and second batteries in the pulse current discharge mode while supplying continuous current to the processor when no voltage differential exists between the first and second batteries and when the wireless communications device is in the traffic state, and
    wherein the power management module is further configured to continuously couple the first and second batteries to the processor when no voltage differential exists between the first and second batteries and when the wireless communications device is in the idle state.

8. The wireless communications device of claim 7 wherein the power management module comprises a switch control module, and a switch configured to intermittently couple the first and second batteries to the processor under control of the switch control module.

9. The wireless communications device of claim 8 wherein the switch comprises a first switch configured to intermittently couple the first battery to the processor under control of the switch control module, and a second switch configured to intermittently couple the second battery to the processor under control of the switch control module.

10. The wireless communications device of claim 9 wherein the first and second switches each comprises a field effect transistor.

11. The wireless communications device of claim 7 wherein the power management module is further configured to determine the processor state as a function of the current supplied to the processor.

12. The wireless communications device of claim 7 wherein the switch control module is further configured to control the switch as a function of voltage measured at each of the first and second batteries.

13. The wireless communications device of claim 12 wherein the selection module is further configured to control the switch to couple one of the first and second batteries having the highest voltage to the processor.

14. The wireless communications device of claim 7 wherein the power management module is further configured to continuously couple the battery with a greater voltage to the processor when a voltage differential exists between the first and second batteries.

15. A power source, comprising:
    first and second batteries; and
    a power management module configured to determine a current required by a load, and, based on the required current, the power management module being further configured to determine whether to operate each of the first and second batteries in a pulse current discharge mode or to continuously couple the first and second batteries to the load,
    wherein the power management module is further configured to operate each of the first and second batteries in the pulse current discharge mode while supplying continuous current to the load when no voltage differential exists between the first and second batteries and when the current required by the load exceeds a threshold, and
    wherein the power management module is further configured to continuously couple the first and second batteries to the load when no voltage differential exists between the first and second batteries and when the current required by the load is below the threshold.

16. The power source of claim 15 wherein the power management module comprises a switch control module, and a switch configured to intermittently couple the first and second batteries to the load under control of the switch control module.

17. The power source of claim 16 wherein the switch comprises a first switch configured to intermittently couple the first battery to the load under control of the switch control module, and a second switch configured to intermittently couple the second battery to the load under control of the switch control module.

18. The power source of claim 17 wherein the first and second switches each comprises a field effect transistor.

19. The power source of claim 16 wherein the switch control module is further configured to control the switch such that the first battery is coupled to the load before removing the second battery from the load.

20. The power source of claim 16 wherein the switch control module is further configured to control the switch as a function of voltage measured at each of the first and second batteries.

21. The power source of claim 16 wherein the selection module is further configured to control the switch to couple one of the first and second batteries having the highest voltage to the load.

22. The power source of claim 15 wherein the power management module is further configured to continuously couple the battery with a greater voltage to the load when a voltage differential exists between the first and second batteries.

* * * * *